United States Patent
Cai et al.

(10) Patent No.: US 10,428,925 B2
(45) Date of Patent: Oct. 1, 2019

(54) HYDROKINETIC TORQUE COUPLING DEVICE WITH LOCK-UP FRICTION CLUTCH

(71) Applicant: VALEO EMBRAYAGES, Amiens (FR)

(72) Inventors: Liguang Cai, Troy, MI (US); Zane Yang, Troy, MI (US)

(73) Assignee: Valeo Embrayages, Amiens (FR)

( * ) Notice: Subject to any disclaimer, the term of this patent is extended or adjusted under 35 U.S.C. 154(b) by 118 days.

(21) Appl. No.: 15/623,243

(22) Filed: Jun. 14, 2017

(65) Prior Publication Data

US 2018/0363749 A1 Dec. 20, 2018

(51) Int. Cl.
| F16H 45/02 | (2006.01) |
| F16H 41/24 | (2006.01) |
| F16D 25/0638 | (2006.01) |

(52) U.S. Cl.
CPC ......... *F16H 45/02* (2013.01); *F16D 25/0638* (2013.01); *F16H 41/24* (2013.01); *F16H 2045/0221* (2013.01); *F16H 2045/0284* (2013.01)

(58) Field of Classification Search
None
See application file for complete search history.

(56) References Cited

U.S. PATENT DOCUMENTS

| 6,938,744 | B2 | 9/2005 | Tomiyama | |
| 7,478,713 | B2* | 1/2009 | Ackermann | F16H 45/02 192/3.29 |
| 8,025,136 | B2 | 9/2011 | Uhler | |
| 8,453,439 | B2 | 6/2013 | Peri | |
| 2009/0127049 | A1* | 5/2009 | Krause | F16H 45/02 192/3.29 |
| 2012/0261225 | A1* | 10/2012 | Sudau | F16D 25/123 192/3.21 |
| 2015/0008086 | A1* | 1/2015 | Mototsune | F16H 45/02 192/3.29 |
| 2016/0215831 | A1* | 7/2016 | Ito | F16D 25/0638 |

* cited by examiner

*Primary Examiner* — Mark A Manley
(74) *Attorney, Agent, or Firm* — Berenato & White, LLC

(57) ABSTRACT

A hydrokinetic torque-coupling device for coupling driving and driven shafts. The torque-coupling device includes a casing, an impeller wheel and a turbine wheel hydrodynamically drivable by the impeller wheel, and a lock-up clutch. The lock-up clutch includes a lockup piston axially movable toward and away from the casing, a first disc carrier non-movably secured to the casing, a second disc carrier radially offset from the first disc carrier and drivingly coupled to the turbine wheel, at least one drive disc non-rotatably and axially movably mounted to the first disc carrier, at least one driven disc non-rotatably and axially movably mounted to the second disc carrier and disposed adjacent to the at least one drive disc so as to define a clutch pack, and a clutch biasing spring disposed between the casing and the clutch pack so as to bias the clutch pack toward the lockup piston.

19 Claims, 8 Drawing Sheets

HYDROKINETIC TORQUE COUPLING DEVICE WITH LOCK-UP FRICTION CLUTCH

1. FIELD OF THE INVENTION

This invention generally relates to hydrokinetic torque coupling devices and, more particularly, to hydrokinetic torque coupling devices including a lock-up clutch with a centered friction disc.

2. BACKGROUND OF THE INVENTION

In the evolution of automobiles from motorized carriages to highly regulated devices for mass transportation, there has been a continuous pursuit of refinement of the basic combination of elements that comprise the automobile. One aspect of this refinement has been the transmission of torque from the engine to the drive system of the vehicle. This transmission of torque has, throughout, been accomplished by various gear or chain driven transmission systems alternatively drivingly connected to, or disconnected from, a source of motive power. The connection/disconnection feature of the drive system is accomplished by means of a clutch. Since the mid-1950's, especially in the United States, this clutch has been a fluid clutch or torque converter. Owing to the inclusion of this fluid torque transmitting coupling, enhanced refinement of the driving experience was obtained, but this refinement came at the expense of lost efficiency. To address this lost efficiency, the torque converter has become, itself, an object of greater refinement and recaptured efficiency. Often times, a modern era torque converter will include a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the era of the lock-up clutch-equipped torque converter, efficiency has been recaptured, but a loss of refinement has also occurred when the clutch is in lock-up mode and when it is transitioning into and out of lock-up mode. This is especially true when the lock-up clutch elements become worn and tolerances between various rotating and fixed elements increase/decrease in accord with their respective wear patterns. To alleviate some of the mechanical coarseness created by the incorporation of lock-up clutches onto torque converters, the clutch systems, themselves, have increased in complexity. For example, the inclusion of a driven intermediate plate, and the further inclusion of elastic damping members, to keep driveline torque oscillations within acceptable parameters, adds rotational mass and complexity to the torque converter sub-assemblies. This added complexity creates the potential for a loss of refinement through vibration caused, in part, by unbalanced decentered rotation of the various components. In addition, it is common for the elastic torque transmitting member equipped devices to, over time and with use, develop rattles and other noises that create a perception of low integrity of the torque converter device. In addition, the assembly of these increasingly complex clutch and damper systems requires more time, patience, and precision. Examples of such torque converters equipped with a lock-up clutch and elastic torque transmission element through an intermediate plate are shown in U.S. Pat. Nos. 8,453,439; 8,025,136; and, U.S. Pat. No. 6,938,744, for example.

While conventional hydrokinetic torque-coupling devices, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a hydrokinetic torque-coupling device for coupling a driving shaft and a driven shaft together. The torque-coupling device comprises a casing rotatable about a rotational axis, an impeller wheel coaxially aligned with the rotational axis and comprising an impeller shell and impeller blades fixedly attached to the impeller shell, a turbine wheel coaxially aligned with and hydrodynamically drivable by the impeller wheel, the turbine wheel comprising a turbine shell and turbine blades fixedly attached to the turbine shell, and a lock-up clutch selectively interconnecting the turbine wheel and the casing. The lock-up clutch includes a lockup piston axially movable toward and away from the casing to position the hydrokinetic torque coupling device into and out of a lockup mode, a first disc carrier non-movably secured to the casing, a second disc carrier radially offset from the first disc carrier and drivingly coupled to the turbine wheel, at least one annular drive disc non-rotatably and axially movably mounted to the first disc carrier, at least one annular driven disc non-rotatably and axially movably mounted to the second disc carrier and disposed adjacent to the at least one annular drive disc so as to define a clutch pack radially extending between the first and second disc carriers, and a clutch biasing spring disposed between the casing and the clutch pack so as to bias the clutch pack toward the lockup piston. The at least one annular drive disc is configured to non-rotatably frictionally engage the at least one annular driven disc in the lockup mode.

According to a second aspect of the present invention, there is provided a method for assembling a hydrokinetic torque-coupling device for coupling together a driving shaft and a driven shaft. The method involves the steps of providing a cover shell, providing an impeller wheel comprising an impeller shell and impeller blades fixedly attached to the impeller shell, providing a lock-up clutch including a lockup, a first disc carrier, a second disc carrier, at least one annular drive disc, and at least one annular driven disc. The method further involves the steps of non-movably securing the first disc carrier to the cover shell, placing a clutch biasing spring axially adjacent to the cover shell, non-rotatably and axially movably mounting the at least one annular drive disc to the first disc carrier and placing the at least one annular driven disc adjacent to the at least one annular drive disc so as to define a clutch pack and to dispose the clutch biasing spring between the cover shell and the clutch pack, non-moveably attaching a center hub to the cover shell, axially movably mounting a lockup piston on the center hub so that the clutch pack disposed between the clutch biasing spring and the lockup piston, non-moveably attaching a piston housing member to the center hub so that the lockup piston is disposed between the clutch pack and the piston housing member, and non-rotatably and axially movably mounting the at least one annular driven disc to the second disc carrier.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

Figure 7:
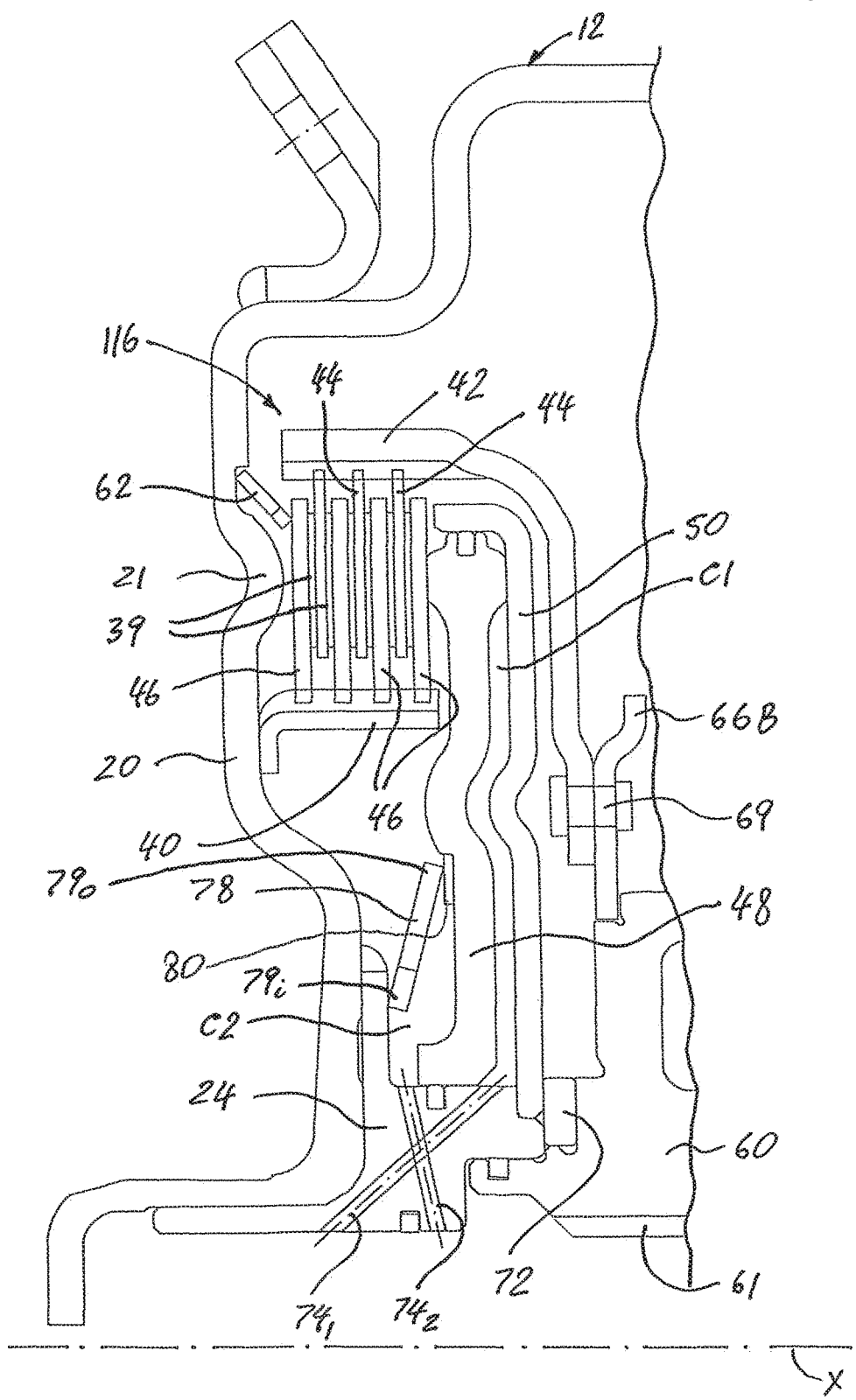
Figure 8:
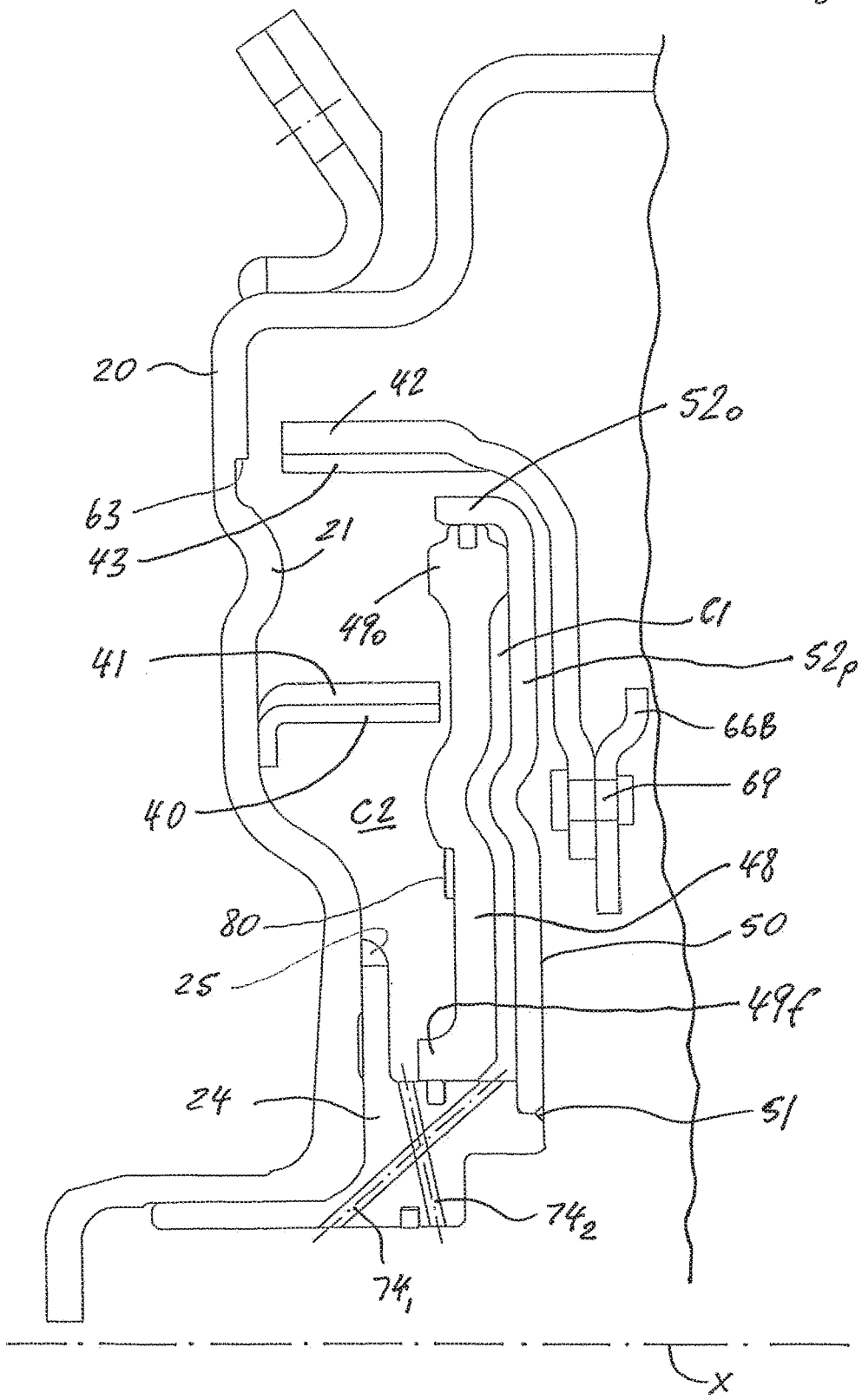

FIG. 7 is a partial sectional view of the hydrokinetic torque-coupling device in accordance with the second exemplary embodiment of the present invention showing a lock-up friction clutch; and FIG. 8 is a partial sectional view of the hydrokinetic torque-coupling device in accordance with the second exemplary embodiment of the present invention showing the lock-up friction clutch without a clutch pack.

DETAILED DESCRIPTION OF EXEMPLARY EMBODIMENT(S) AND EMBODIED METHOD(S) OF THE INVENTION

Reference will now be made in detail to exemplary embodiment(s) and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 1:
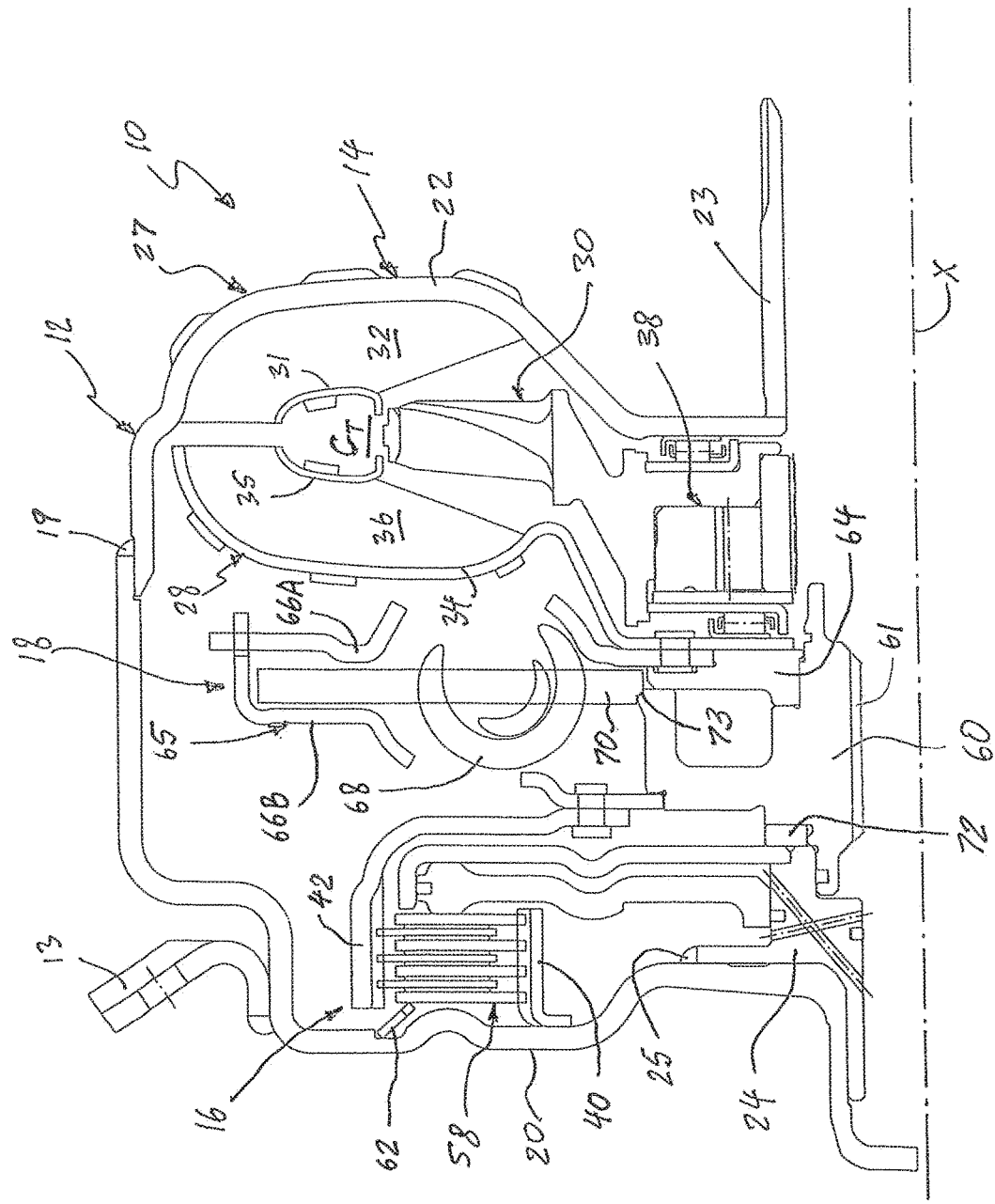
FIG. 1 is a sectional view of a hydrokinetic torque-coupling device in accordance with a first exemplary embodiment of the present invention.

A hydrokinetic torque-coupling device in accordance with an exemplary embodiment of the present invention is generally represented in the accompanying drawings by reference numeral 10, as best shown in FIG. 1. The hydrokinetic torque-coupling device 10 is intended to couple a driving shaft and a driven shaft (not shown), for example in a motor vehicle. In this case, the driving shaft is an output shaft of an internal combustion engine (ICE) (not shown) of the motor vehicle and the driven shaft is an input shaft of an automatic transmission of the motor vehicle.

The hydrokinetic torque-coupling device 10 comprises a sealed casing 12 filled with a fluid, such as oil or transmission fluid, and rotatable about a rotational axis X, a hydrokinetic torque converter 14, a lock-up clutch 16 and an elastic damping device (or torsional vibration damper) 18. Hereinafter the axial and radial orientations are considered with respect to the rotational axis X of the torque-coupling device 10. Both the lock-up clutch 16 and the torsional vibration damper 18 are disposed in the casing 12.

The sealed casing 12, the torque converter 14, the lock-up clutch 16 and the torsional vibration damper 18 are all rotatable about the rotational axis X. The drawings discussed herein show half-views, that is, a cross-section of the portion or fragment of the hydrokinetic torque-coupling device 10 above the rotational axis X. As is known in the art, the torque-coupling device 10 is symmetrical about the rotational axis X. The relative terms such as "axially," "radially," and "circumferentially" are with respect to orientations parallel to, perpendicular to, and circularly (or angularly) around the rotational axis X, respectively.

The sealed casing 12 according to the first exemplary embodiment as illustrated in FIG. 1 includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 19. The first shell 20 is non-movably (i.e., fixedly) connected to the driving shaft, more typically to the output shaft of the ICE through a flexplate that is non-rotatably fixed to the driving shaft, so that the casing 12 turns at the same speed at which the engine operates for transmitting torque. Specifically, in the illustrated embodiment of FIG. 1, the casing 12 is rotatably driven by the ICE and is non-rotatably coupled to the driving shaft thereof, such as with one or more connecting members 13. Typically, the connecting member(s) 13 are/is fixedly secured, such as by welding, to the first shell 20. Each of the first and second shells 20, 22 are integral or one-piece and may be made, for example, by press-forming one-piece metal sheets.

The casing 12 further includes an annular center hub 24 non-moveably attached (i.e., fixed) to a radially inner end of the cover shell 20, such as by weld 25. The center hub 24 is configured to center the cover shell 20 during the assembly of the torque-coupling device 10.

The torque converter 14 comprises an impeller wheel (sometimes referred to as the pump, impeller assembly or impeller) 27, a turbine wheel (sometimes referred to as the turbine assembly or turbine) 28, and a stator (sometimes referred to as the reactor) 30 interposed axially between the impeller wheel 27 and the turbine wheel 28. The impeller wheel 27, the turbine wheel 28, and the stator 30 are coaxially aligned with one another and the rotational axis X. The impeller wheel 27, the turbine wheel 28, and the stator 30 collectively form a torus. The impeller wheel 27 and the turbine wheel 28 may be fluidly coupled to one another in operation as known in the art. In other words, the turbine wheel 28 is hydro-dynamically drivable by the impeller wheel 27.

The impeller wheel 27 comprises the impeller shell 22, an annular (or cylindrical) impeller hub 23 fixedly (i.e., non-moveably) attached to the impeller shell 22, a substantially annular impeller core ring 31, and a plurality of impeller blades 32 fixedly (i.e., non-moveably) attached, such as by brazing, to the impeller shell 22 and the impeller core ring 31. The impeller shell 22 is an integral (or unitary) component, e.g., made of a single part or separate components fixedly connected together. The turbine wheel 28, as best shown in FIG. 1, comprises a substantially annular, semi-toroidal (or concave) turbine shell 34 rotatable about the rotational axis X, a substantially annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a substantially toroidal inner chamber (or torus chamber) $C_T$ therebetween. The stator 30 is positioned between the impeller wheel 27 and the turbine wheel 28 to redirect fluid from the turbine wheel 28 back to the impeller wheel 27 in an efficient manner. The stator 30 is typically mounted on a one-way (or overrunning) clutch 38 to prevent the stator 30 from counter-rotation. Conventionally, the turbine blades 36 of the turbine wheel 28 interact, in a known manner, with the impeller blades 32 of the impeller wheel 27.

The stator 30 is coupled in rotation to a stationary stator shaft through the one-way (or overrunning) clutch 38. At low turbine shaft speeds, the impeller wheel 27 causes hydraulic fluid to flow from the impeller wheel 27 to the turbine wheel 28, and flow back to the impeller wheel 27 through the stator 30, providing a first power flow path. The stator 30 is held against rotation by the one-way clutch 38 such that it can redirect the fluid flow and provide a reaction torque for torque multiplication. The one-way clutch 38 permits rotation of the stator 30 in one direction only. In other words, the stator 30 is mounted on the one-way clutch 38 to prevent the stator 30 from counter-rotation.

Figure 2:
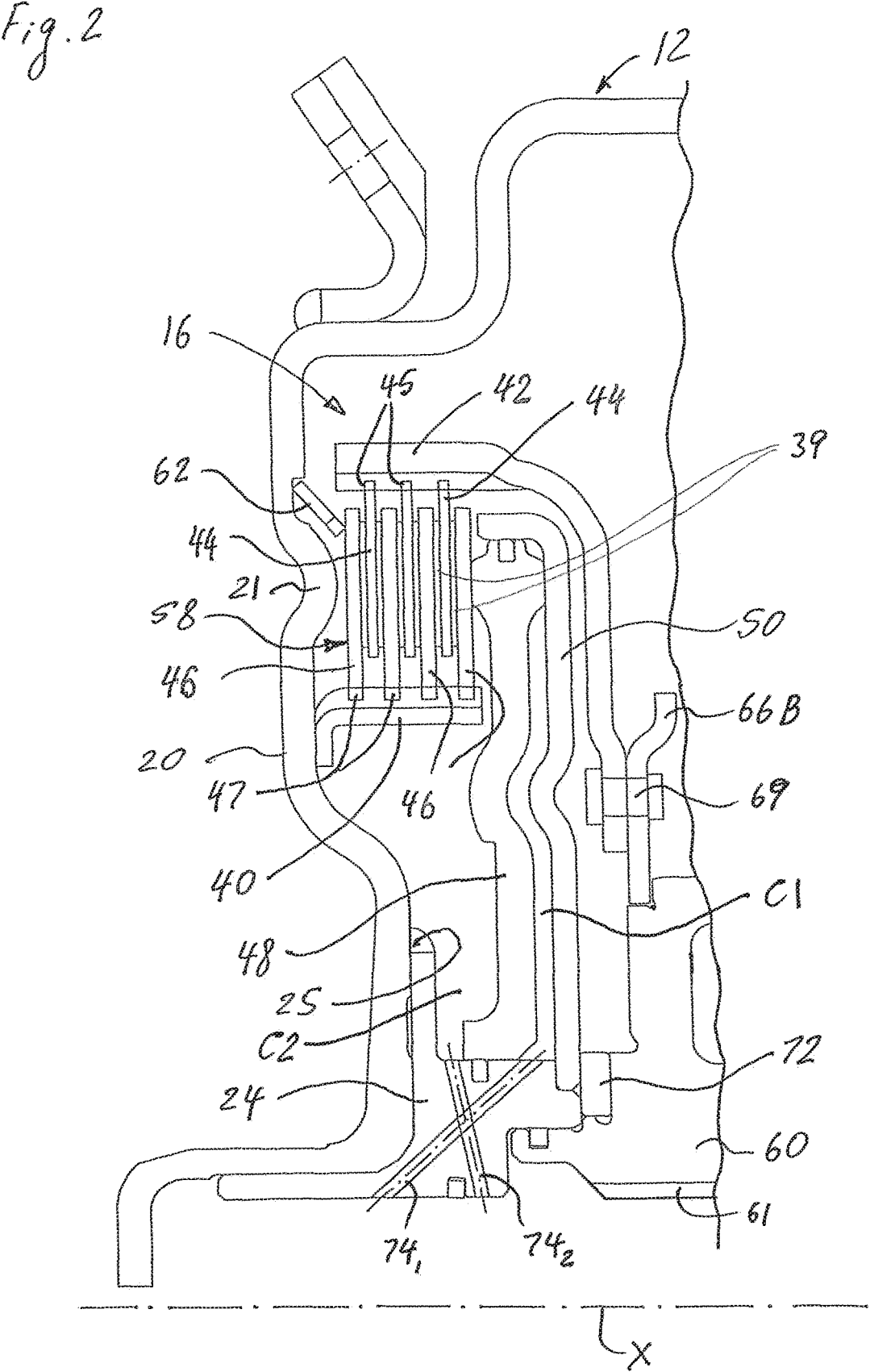
FIG. 2 is a partial sectional view of the hydrokinetic torque-coupling device in accordance with the first exemplary embodiment of the present invention showing a lock-up friction clutch.
Figure 3:
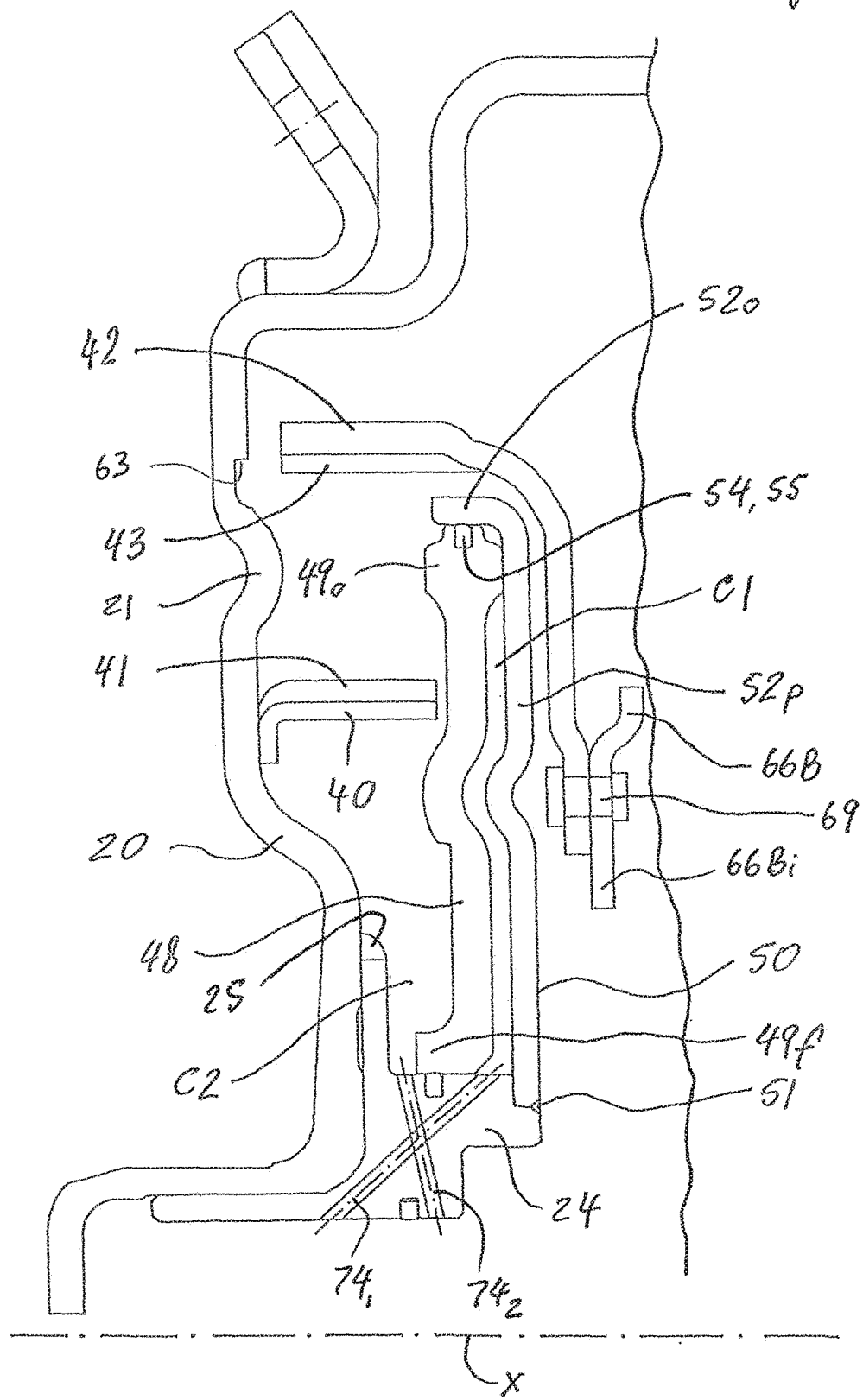
FIG. 3 is a partial sectional view of the hydrokinetic torque-coupling device in accordance with the first exemplary embodiment of the present invention showing the lock-up friction clutch without a clutch pack.
Figure 4:
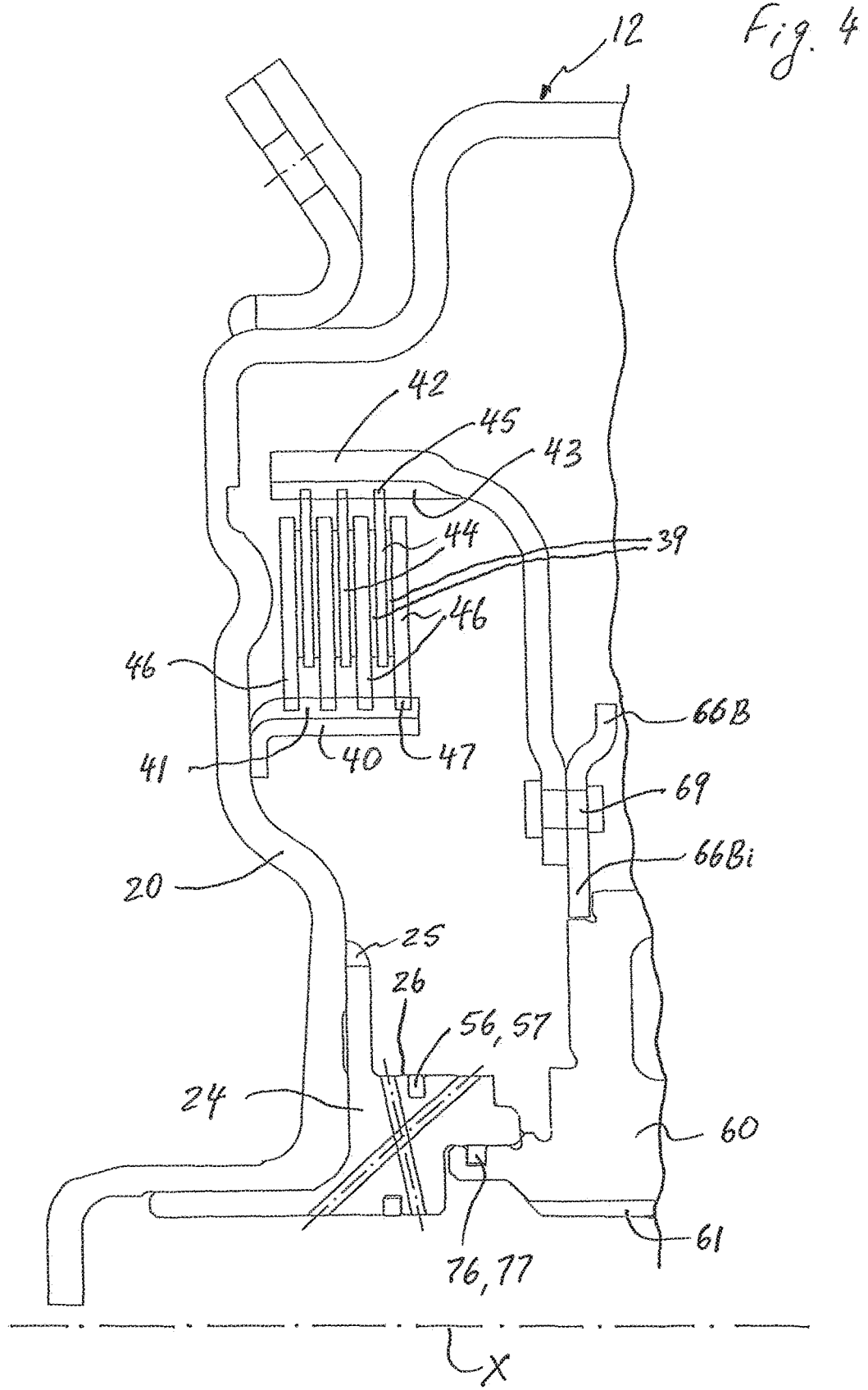
FIG. 4 is a partial sectional view of the hydrokinetic torque-coupling device in accordance with the first exemplary embodiment of the present invention showing the lock-up friction clutch without a lockup piston and a piston housing member.

The lock-up clutch 16 of the torque-coupling device 10 is placed between the torsional vibration damper 18 and the cover shell 20. The lock-up clutch 16 of the torque-coupling device 10 comprises a radially inner (or first) disc carrier 40 non-movably secured (i.e., fixed), such as by welding, to the cover shell 20 of the casing 12, a radially outer (or second) disc carrier 42, one or more annular drive (or friction) discs 44, each non-rotatably coupled the radially outer disc carrier 42, and one or more annular driven (or counter) discs 46, each non-rotatably coupled to the inner disc carrier 40, as best shown in FIGS. 2 and 3. As best shown in FIG. 2, each of the annular friction discs 44 and each of the annular counter discs 46 extends radially between the inner disc carrier 40 and the outer disc carrier 42. An annular friction liner 39 is attached to each of axially opposite friction faces of each of the friction discs 44, such as by adhesive bonding, as best shown in FIGS. 2 and 4. The friction discs 44 and the counter discs 46 together define a clutch pack 58 radially extending between the inner disc carrier 40 and the outer disc carrier 42.

The inner disc carrier 40 is a cylindrical drum member formed with splines, i.e., a plurality of axially extending inner teeth 41 (best shown in FIG. 3). Similarly, the outer disc carrier 42 is a cylindrical drum member formed with splines, i.e., a plurality of axially extending inner teeth 43 (best shown in FIG. 3). A radially outer portion of each of the friction discs 44 is formed with splines, i.e., interlocking teeth 45, engaged with the inner teeth 43 of the outer disc carrier 42. Accordingly, the friction discs 44 are non-rotatable but axially moveable relative to the outer disc carrier 42. Similarly, a radially inner portion of each of the counter discs 46 is formed with splines, i.e., interlocking teeth 47, engaged with the outer teeth 41 of the inner disc carrier 40. Accordingly, the counter discs 46 are non-rotatable but axially moveable relative to the inner disc carrier 40. The friction discs 44 alternate with the counter discs 46. The friction discs 44 are axially moveable along the rotational axis X to and from the cover shell 20 of the casing 12, as best shown in FIG. 2. Similarly, the counter discs 46 are axially moveable along the rotational axis X to and from the cover shell 20 of the casing 12.

The lock-up clutch 16 of the torque-coupling device 10 further comprises a generally annular lockup piston 48, axially movable to and from the cover shell 20, and an annular piston housing member 50 that is non-moveably attached (i.e., fixed) to the center hub 24 of the cover shell 20, such as by weld 51, as best shown in FIG. 3 Thus, the piston housing member 50 and the center hub 24 are non-movably (i.e., fixedly) interconnected and sealed together. Moreover, the piston housing member 50 is axially spaced from the cover shell 20 so that the lockup piston 48 is disposed between the piston housing member 50 and the cover shell 20.

The piston housing member 50 has a radial plate portion 52p and a substantially cylindrical outer portion 52o extending from a radially outer end of the plate portion 52p toward the lockup piston 48 in the axial direction, as best shown in FIG. 3. A radially inner cylindrical surface of the cylindrical outer portion 52o of the piston housing member 50 slidably engages in the axial direction on a radially outer end 49o of the lockup piston 48.

The radially outer end 49o of the lockup piston 48 defines a pressure portion configured to press the clutch pack 58 of the lock-up clutch 16 when the lock-up clutch 16 is activated. Extending axially at a radially inner peripheral end of the lockup piston 48 is a substantially cylindrical flange 49f that is proximate the rotational axis X relative to the radially outer end 49o of the lockup piston 48. The cylindrical flange 49f of the lockup piston 48 is rotatable and axially moveable relative to the center hub 24. The lockup piston 48 with the cylindrical flange 49f is an integral (or unitary) component, e.g., made of a single part, for example, by press-forming one-piece metal sheets, or includes separate components fixedly connected together. Similarly, the piston housing member 50 with the plate portion 52p and the cylindrical outer portion 52o is an integral (or unitary) component, e.g., made of a single part, for example, by press-forming one-piece metal sheets, or includes separate components fixedly connected together.

The radially outer end 49o of the lockup piston 48 is formed with an annual groove 54 configured to receive an O-ring 55 therein, as best shown in FIGS. 2 and 3. The O-ring 55 is in sliding contact with the cylindrical outer portion 52o of the piston housing member 50. The sealing member (e.g., O-ring) 55 creates a seal at the interface of the substantially cylindrical outer portion 52o of the piston housing member 50 and the radially outer end 49O of the lockup piston 48. Similarly, a substantially radially outer peripheral surface 26 of the center hub 24 includes an annular slot (or seal groove) 56 for receiving a sealing member, such as an O-ring 57, as best shown in FIG. 4. The sealing member (e.g., O-ring) 57 creates a seal at the interface of the substantially cylindrical flange 49f of the lockup piston 48 and the outer peripheral surface 26 of the center hub 24. As discussed in further detail below, the lockup piston 48 is axially movably relative to the center hub 24 along this interface. Thus, a hydraulically sealed first hydraulic chamber C1 is defined between the lockup piston 48, the piston housing member 50 and the center hub 24. A second hydraulic chamber C2 is defined between the lockup piston 48, the cover shell 20 and the center hub 24. The radially outer peripheral surface 26 of the center hub 24 centers the lockup piston 48. The cylindrical flange 49f of the lockup piston 48 is axially slidably mounted on the outer peripheral surface 26 of the center hub 24.

The cover shell 20 of the casing 12 is formed with an axial protrusion 21 extending axially inwardly toward the lockup piston 48 so as to face the pressure portion 49o. Moreover, the axial protrusion 21 of the cover shell 20 is disposed radially on the substantially same radius as the pressure portion 49O of the lockup piston 48 and radially between the inner disc carrier 40 and the outer disc carrier 42, as best shown in FIG. 2.

The radially outer disc carrier 42 is elastically coupled to an output hub 60 through the torsional vibration damper 18, as best shown in FIG. 1. The output hub 60 is rotatable about the rotational axis X and is coaxial with the driven shaft. The output hub 60 is non-rotatably coupled to the driven shaft with splines 61.

The lock-up clutch 16 further includes a clutch (or first) biasing spring 62 disposed between the cover shell 20 of the casing 12 and the clutch pack 58 so as to bias the clutch pack 58 toward the lockup piston 48. According to the exemplary embodiment of the present invention, the clutch biasing spring 62 is in the form of an annular disc spring, such as a Belleville washer or diaphragm spring. A radially outer end of the Belleville washer 62 is located in an annular recess 63 in the cover shell 20 of the casing 12, as best shown in FIG. 3, for supporting the radially outer end of the Belleville washer 62 in the axial and radial directions. A radially inner end of the Belleville washer 62 engages (is in contact with) one (the leftmost) of the counter discs 46 of the clutch pack 58.

Figure 5:
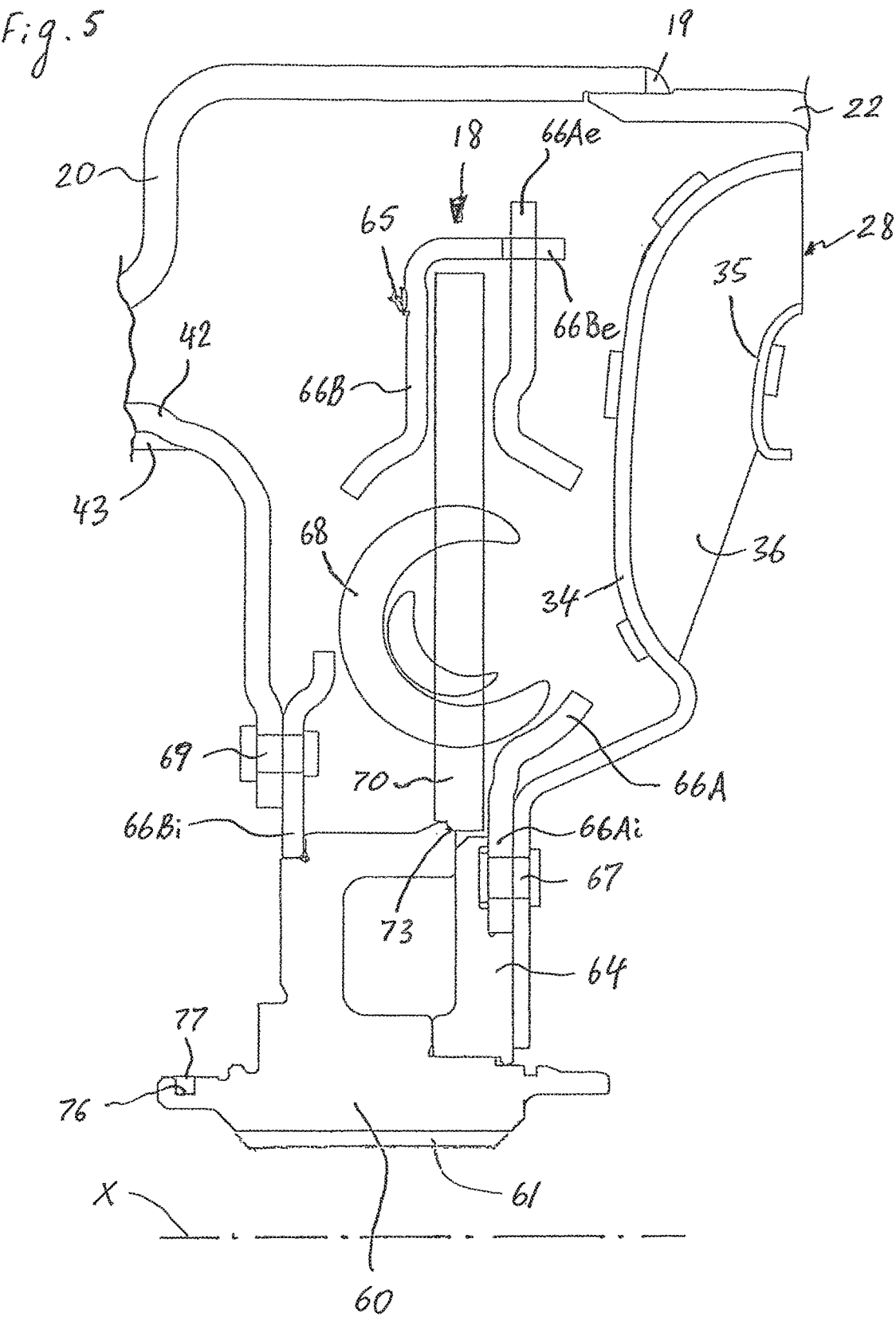
FIG. 5 is a partial sectional view of the hydrokinetic torque-coupling device in accordance with the first exemplary embodiment of the present invention showing a torsional vibration damper.

The torsional vibration damper 18 includes an input (or drive) member 65, a plurality of circumferentially acting torque transmitting (or damper) elastic members (springs) 68, and an output (or driven) member 70 elastically coupled to the input member 65 through the elastic members 68. The input member 65 includes a substantially annular first retainer plate 66A, and a substantially annular second retainer plate 66B disposed axially opposite the first retainer plate 66A, as best shown in FIG. 1. The first and second retainer plates 66A, 66B are mounted adjacent to axially opposite sides (surfaces) of the driven member 70 so as to be oriented parallel to each other and coaxially with the rotational axis X. The first and second retainer plates 66A, 66B are non-rotatably coupled to one another (as best shown in FIG. 1) so as to be rotatable relative to the output member 70 through the elastic members 68. Specifically, a radially outer end 66Ae of the first retainer plate 66A non-rotatably engages a radially outer end 66Be of the second retainer plate 66B, as best shown in FIG. 5. For example, the radially outer end 66Ae of the first retainer plate 66A may be formed with teeth non-rotatably engaging teeth formed on the radially outer end 66Be of the second retainer plate 66B. Thus, the first and second retainer plates 66A, 66B of the input member 65 are non-rotatable relative to one another, but rotatable relative to the output member 70. Moreover, the elastic members 68 are disposed circumferentially in series between the output member 70 and the input member 65 (i.e., the first and second retainer plates 66A, 66B). Specifically, the elastic members 68 are interposed axially between the first and second retainer plates 66A, 66B. In other words, the input member 65 at least partially houses the elastic members 68 so as to radially support the elastic members 68.

Moreover, a radially inner end 66Ai of the first retainer plate 66A is non-moveably attached to the turbine shell 34 of the turbine wheel 28, such as by rivets 67, as best shown in FIG. 5. Thus, the input member 65 of the torsional vibration damper 18 is non-rotatable relative to the turbine wheel 28 of the torque converter 14. The radially outer disc carrier 42 is non-moveably attached to the second retainer plate 66B, such as by rivets 69, a best shown in FIGS. 2, 3 and 5. In turn, a radially inner end 66Bi of the second retainer plate 66B is rotatably (slidably) supported by the output hub 60 to center the second retainer plate 66B during the assembly of the torque-coupling device 10, as best shown in FIGS. 2, 4 and 5. Thus, the radially outer disc carrier 42 (non-moveably attached to the second retainer plate 66B by the rivets 69) is also rotatably (slidably) supported by the output hub 60, a best shown in FIGS. 1, 2 and 4. The output hub 60 is rotatable about the rotational axis X and is coaxial with the driven shaft. The output hub 60 is non-rotatably coupled to the driven shaft with splines 61. The output hub 60 is configured to center the second retainer plate 66B during the assembly of the torque-coupling device 10.

The torque-coupling device 10 further comprises a centering plate 64 configured to center the first retainer plate 66A during the assembly of the torque-coupling device 10. The centering plate 64 is non-moveably attached to the output hub 60, such as by press-fitting. The first retainer plate 66A of the input member 65 and the turbine shell 34 of the turbine wheel 28 are rotatable relative to the centering plate 64 and the output hub 60. The output member 70 is non-moveably attached to the output hub 60, such as by weld 73, as best shown in FIG. 5.

The center hub 24 is rotatable relative to the output hub 60. Accordingly, a thrust bearing 72 (such as a metal or plastic bushing) is disposed axially between the center hub 24 and the output hub 60, as best shown in FIG. 2. Moreover, the center hub 24 is provided with a first hydraulic channel $74_1$ and a second hydraulic channel $74_2$, both in the form of a cylindrical bore through the center hub 24. The first hydraulic channel $74_1$ is fluidly interconnected to the first hydraulic chamber C1, while the second hydraulic channel $74_2$ is fluidly interconnected to the second hydraulic chamber C2. In other words, the first hydraulic channel $74_1$ fluidly interconnects a source of pressurized hydraulic fluid with the first hydraulic chamber C1, while the second hydraulic channel $74_2$ fluidly interconnects the source of pressurized hydraulic fluid with the second hydraulic chamber C2.

In operation, the lock-up clutch 16 is closed (or engaged) when the lockup piston 48 is displaced axially toward the cover shell 20 under the effect of hydraulic pressure so as to frictionally engage (or clamp) the friction discs 44 between the counter discs 46. When the lock-up clutch 16 is closed and the friction discs 44 are frictionally engaged with the counter discs 46 by action of the lockup piston 48, the engine torque is passed from the casing 12 to the friction discs 44. Thus, when under the effect of hydraulic pressure the lockup piston 48 clamps the friction discs 44 between the counter discs 46, the locking of the lock-up clutch 16 permits direct driving of the driven shaft by the splines 61 on the output hub 60 from the casing 12, non-rotatably connected to the crankshaft of the ICE of the vehicle, through the torsional vibration damper 18 without jolts, and vibrations from the engine are filtered.

The hydraulic fluid, such as oil, that is supplied under pressure to the first hydraulic chamber C1 through the first hydraulic channel $74_1$, causes the lockup piston 48 to move axially toward the cover shell 20 and pushes the clutch pack 58 (including the friction discs 44 with the friction liners 39, and the counter discs 46) toward to the cover shell 20 for placing the lock-up clutch 16 in a lockup position (or mode). The clutch pack 58 compresses the Belleville washer 62 first. At this stage, the gradient of lock-up torque with respect to hydraulic pressure is relatively small (depending on the stiffness of the Belleville washer 62) for better slip control. The Belleville washer 62 compresses and deforms in response to the applied hydraulic pressure. Eventually, one of the counter discs 46 of the clutch pack 58 contacts the cover shell 20. The gradient of lock-up torque with respect to hydraulic pressure is relatively much larger (depending on the pressure applied to the clutch pack 58) now to obtain desire lock-up torque capacity.

Eventually the clutch pack 58 is pressed against the cover shell 20 and the clutch biasing spring 62 so that the friction discs 44 frictionally non-rotatably engage the counter discs 46 in the lockup position. In other words, in the lockup position, the inner disc carrier 40 that is non-rotatably frictionally attached to the casing 12, non-rotatably engages the outer disc carrier 42, which is non-rotatably attached to the input member 65 of the torsional vibration damper 18. Therefore, in the lockup position, the turbine wheel 28 is coupled to the casing 12 through the torsional vibration damper 18.

The hydraulic fluid that is supplied under pressure to the second hydraulic chamber C2 through the second hydraulic channel $74_2$ in combination with an elastic force of the clutch biasing spring 62, causes the lockup piston 48 to move axially away from the cover shell 20 and release the clutch pack 58 so that the friction discs 44 frictionally disengage from the counter discs 46 in a non-lockup position (or mode). In other words, in the non-lockup position, the radially outer disc carrier 42 is frictionally disengaged the inner disc carrier 40. Therefore, in the non-lockup position, the turbine wheel 28 is frictionally disengaged from the casing 12. In the non-lockup position, the turbine wheel 28 is fluidly coupled to the casing 12.

The output hub 60 is formed with an annual groove 76 configured to receive a sealing member (e.g., O-ring) 77 therein, as best shown in FIGS. 4 and 5. The O-ring 77 is in sliding contact with a cylindrical inner portion of the center hub 24, as best shown in FIG. 4. The O-ring 77 creates a seal at the interface of the center hub 24 and the output hub 60. The sealing member 77 prevents oil leakage between the center hub 24 and the output hub 60.

The hydrokinetic torque-coupling device 10 of the present invention achieves a better slip control performance in the lock-up clutch 16 and also obtains desired lock-up torque capacity. In order to achieve better slip control, the gradient of lock-up torque with respect to hydraulic pressure should be small enough. In order to obtain the desired lock-up torque, the gradient of lock-up torque with respect to hydraulic pressure should be large enough.

A method for assembling the hydrokinetic torque-coupling device 10 is described below. It should be understood that this exemplary method may be practiced in connection with the other embodiments described herein. This exemplary method is not the exclusive method for assembling the turbine assembly described herein. While the methods for assembling the hydrokinetic torque-coupling device 10 may be practiced by sequentially performing the steps as set forth below, it should be understood that the methods may involve performing the steps in different sequences.

The method for assembling the hydrokinetic torque-coupling device 10 is as follows. First, the impeller wheel 27, the turbine wheel 28, the stator 30, and the torsional vibration damper 18 may each be preassembled. The impeller wheel 27 and the turbine wheel 28 are formed by stamping from steel blanks or by injection molding of a polymeric material. The impeller wheel 27, the turbine wheel 28 and the stator 30 subassemblies are assembled together so as to form the torque converter 14.

The torsional vibration damper 18 is then added. The first retainer plate 66A and the second retainer plate 66B are formed by stamping from a steel blank. Before the torsional vibration damper 18 is assembled, the radially inner end 66Ai of the first retainer plate 66A is non-moveably attached to the turbine shell 34 of the turbine wheel 28, such as by the rivets 67 or welding, as best shown in FIG. 5. The elastic members 68 are mounted axially between the first and second retainer plates 66A and 66B, then the first and second retainer plates 66A, 66B are non-rotatably coupled to one another by appropriate means, such as by teeth (formed on radially outer ends of the first and second retainer plates 66A, 66B) or welding so as to define the input member 65 of the torsional vibration damper 18. The elastic members 68 are mounted angularly between the input member 65 and the output member 70 so as to elastically couple the output member 70 to the input member 65 through the elastic members 68. Then, the output member 70 is non-rotatably coupled to the output hub 60, such as by welding 73, as best shown in FIGS. 1 and 5.

Next, the cover shell 20 of the casing 12 and the annular center hub 24 are provided. The center hub 24 is formed with a first hydraulic channel $74_1$ and a second hydraulic channel $74_2$, both in the form of a cylindrical bore through the center hub 24. A radially lower end of the cover shell 20 is non-moveably and sealingly secured, such as by the welding at 25, to the center hub 24, as best shown in FIGS. 1-3. Then, the radially inner disc carrier 40 is non-moveably secured to the cover shell 20. Next, the clutch biasing spring 62 is placed axially adjacent to the cover shell 20. After that, one or more annular drive (or friction) discs 44, and one or more annular driven (or counter) discs 46 are provided. Then, each of the counter discs 46 is non-rotatably coupled and axially movably mounted to the radially inner disc carrier 40, such as by splice connection, and each of the friction discs 44 is mounted alternate with the counter discs 46 (i.e., placed adjacent to at least one of the drive discs 46) so as to define a clutch pack 58, such that the clutch biasing spring 62 is disposed axially between the cover shell 20 and the clutch pack 58.

Then, the cylindrical flange 49f of the lockup piston 48 is mounted to the center hub 24 so as to be rotatable and axially moveable relative to the center hub 24, and so that the clutch pack 58 is disposed between the clutch biasing spring 62 and the lockup piston 48. At the same time the cylindrical outer portion 49o of the lockup piston 48 slidably engages in the axial direction the cylindrical outer portion 52o of the piston housing member 50 so as to define the hydraulically sealed first hydraulic chamber C1 between the lockup piston 48, the piston housing member 50 and the center hub 24. The lockup piston 48 with the outer portion 49o and the cylindrical flange 49f is an integral (or unitary) component, e.g., made of a single part, for example, by press-forming one-piece metal sheets, or includes separate components fixedly connected together. Next, the piston housing member 50 is fixed (i.e., non-moveably attached) to the center hub 24, such as by the weld 51, so that the lockup piston 48 is disposed between the clutch pack 58 and the piston housing member 50. After that, the radially outer disc carrier 42 is provided. Each of the friction discs 44 is non-rotatably coupled and axially movably mounted to the radially outer disc carrier 42, such as by splice connection, so that the friction discs 44 alternate with the counter discs 46. The friction discs 44 and the counter discs 46 are mounted to the radially outer disc carrier 42 and the radially inner disc carrier 40, respectively, so that the friction and counter discs 44, 46 are axially disposed between the cover shell 20 and the lockup piston 48.

Then, the cover shell 20 is non-moveably and sealingly secured, such as by welding at 19, to the impeller shell 22, as best shown in FIG. 1. After that, the torque-coupling device 10 is mounted to the driven shaft (i.e., the input shaft of the automatic transmission of the motor vehicle) so that the output hub 60 is splined directly to the transmission input shaft.

Figure 6:
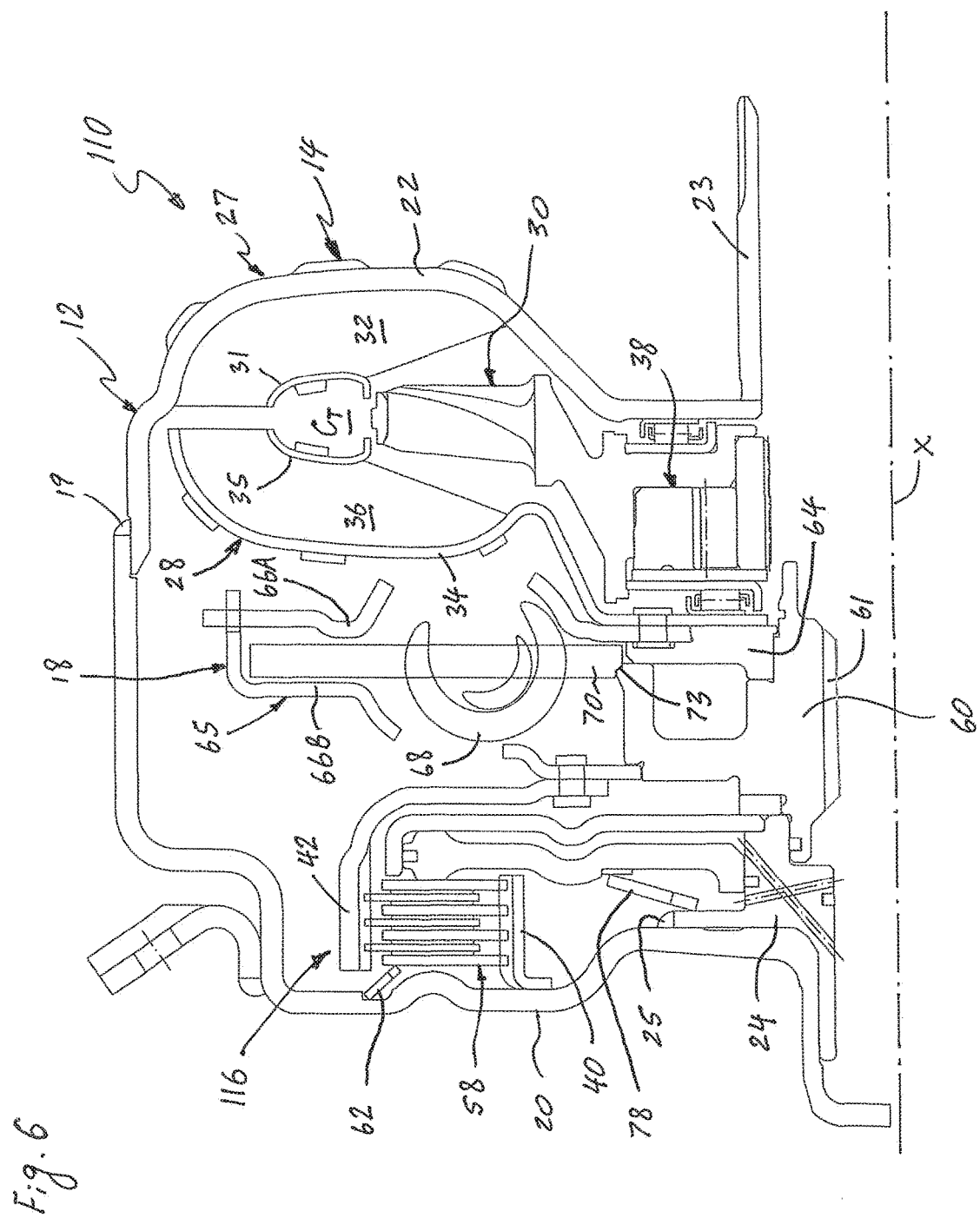
FIG. 6 is a sectional view of a hydrokinetic torque-coupling device in accordance with a second exemplary embodiment of the present invention.

Various modifications, changes, and alterations may be practiced with the above-described embodiment, including but not limited to the additional embodiment(s) shown in FIGS. 6-8. In the interest of brevity, reference characters in FIGS. 6-8 that are discussed above in connection with FIGS. 1-5 are not further elaborated upon below, except to the extent necessary or useful to explain the additional embodiments of FIGS. 6-8. Modified components and parts are indicated by the addition of a hundred digit to the reference numerals of the components or parts.

In a hydrokinetic torque-coupling device 110 of a second exemplary embodiment illustrated in FIGS. 6-8, the lock-up clutch 16 is replaced by a lock-up clutch 116. The hydrokinetic torque-coupling device 110 of FIGS. 6-8 corresponds substantially to the hydrokinetic torque-coupling device 10 of FIGS. 1-5, and portions, which differ, will therefore be explained in detail below.

The lock-up clutch 116 of the torque-coupling device 110 is located between the torsional vibration damper 18 and the cover shell 20. The lock-up clutch 116 comprises a radially inner (or first) disc carrier 40 non-movably secured (i.e., fixed), such as by welding, to the cover shell 20 of the casing 12, a radially outer (or second) disc carrier 42, one or more annular drive (or friction) discs 44 each non-rotatably coupled the radially outer disc carrier 42, and one or more annular driven (or counter) discs 46 each non-rotatably coupled the inner disc carrier 40, as best shown in FIGS. 6 and 7. As best shown in FIG. 7, each of the annular friction discs 44 and each of the annular counter discs 46 extends radially between the inner disc carrier 40 and the outer disc carrier 42. The annular friction liner 39 is attached to each of axially opposite friction faces of each of the friction discs 44, such as by adhesive bonding, as best shown in FIG. 7. The friction discs 44 and the counter discs 46 together define a clutch pack 58 radially extending between the inner disc carrier 40 and the outer disc carrier 42. The friction discs 44 are non-rotatable but axially moveable relative to the outer disc carrier 42. Similarly, the counter discs 46 are non-rotatable but axially moveable relative to the inner disc carrier 40. The friction discs 44 alternate with the counter discs 46. The friction discs 44 are axially moveable along the rotational axis X to and from the cover shell 20 of the casing 12, as best shown in FIG. 7. Similarly, the counter discs 46 are axially moveable along the rotational axis X to and from the cover shell 20 of the casing 12.

The lock-up clutch 116 further includes a clutch (or first) biasing spring 62, and a piston (or second) biasing spring 78. As best shown in FIG. 7, the second biasing spring 78 is disposed radially inside of the first biasing spring 62.

The first biasing spring 62 is disposed between the cover shell 20 of the casing 12 and the clutch pack 58 so as to bias the clutch pack 58 toward the lockup piston 48. According to the exemplary embodiment of the present invention, the first biasing spring 62 is in the form of an annular disc spring, such as a Belleville washer or diaphragm spring. A radially outer end of the Belleville washer 62 is located in an annular recess 63 in the cover shell 20 of the casing 12, as best shown in FIGS. 6 and 7, for supporting the radially outer end of the Belleville washer 62 in the axial and radial directions. A radially inner end of the Belleville washer 62 engages (is in contact with) one (the leftmost) of the counter discs 46 of the clutch pack 58.

The second biasing spring 78 is disposed axially between the center hub 24 (or the cover shell 20 of the casing 12) and the lockup piston 48 so as to bias the lockup piston 48 toward the piston housing member 50, i.e., in the direction away from the cover shell 20 and away from the clutch pack 58. According to the exemplary embodiment of the present invention, the second biasing spring 78 is in the form of an annular disc spring, such as a Belleville washer or diaphragm spring. A radially outer end 79o of the second biasing spring 78 engages the lockup piston 48 through an engagement disc 80 (best shown in FIG. 8), while a radially inner end 79i of the second biasing spring 78 engages (is in contact with) the center hub 24 (or the cover shell 20 of the casing 12), as best shown in FIG. 7. Alternatively, the radially inner end 79i of the second biasing spring 78 (instead of the radially outer end 79o thereof) may engage the lockup piston 48 through the engagement disc 80, while the radially outer end 79o of the second biasing spring 78 may engage the center hub 24 (or the cover shell 20 of the casing 12) (not shown).

The engagement disc 80 is provided for supporting the radially outer end 79o of the second biasing spring 78 in the axial direction. The engagement disc 80 is made of a material harder than the material of the second biasing spring 78. In other words, the material of the engagement disc 80 (such as tool steel) has a higher hardness (for example, HRC 55-60) than the material of the second biasing spring 78 (for example, HRC 42-48). The hardness of the material of the lockup piston 48 according to the exemplary embodiment of the present invention is between HRC 30 and HRC 35.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for coupling a driving shaft and a driven shaft together, comprising:
   a casing rotatable about a rotational axis, the casing comprising an impeller shell and an axially opposite cover shell non-moveably secured to the impeller shell;
   an impeller wheel coaxially aligned with the rotational axis and comprising an impeller shell and impeller blades fixedly attached to the impeller shell;
   a turbine wheel coaxially aligned with and hydrodynamically drivable by the impeller wheel, the turbine wheel comprising a turbine shell and turbine blades fixedly attached to the turbine shell;
   a center hub non-moveably attached to the cover shell of the casing; and
   a lock-up clutch selectively interconnecting the turbine wheel and the casing, the lock-up clutch including:
      a piston housing member non-moveably attached to the center hub, the piston housing member having a radial plate portion and a cylindrical outer portion extending from a radially outer end of the plate portion toward the cover shell in the axial direction;
      a lockup piston axially movable toward and away from the casing to position the hydrokinetic torque coupling device into and out of a lockup mode, the lockup piston axially moveable and non-rotatable relative to the piston housing member;
      a first disc carrier non-movably secured to the casing;
      a second disc carrier radially offset from the first disc carrier and drivingly coupled to the turbine wheel;
      at least one annular drive disc non-rotatably and axially movably mounted to the first disc carrier;
      at least one annular driven disc non-rotatably and axially movably mounted to the second disc carrier, the at least one driven disc disposed adjacent to the at least one annular drive disc so as to define a clutch pack radially extending between the first and second disc carriers; and
      a clutch biasing spring disposed between the casing and the clutch pack so as to bias the clutch pack toward the lockup piston;
   the at least one annular drive disc configured to non-rotatably frictionally engage the at least one annular driven disc in the lockup mode;
   the casing formed with an axial protrusion extending axially inwardly toward the lockup piston so as to face a pressure portion of the lockup piston;
   the first disc carrier non-movably secured to the cover shell of the casing;
   the clutch biasing spring disposed between the cover shell of the casing and the clutch pack;
   the lockup piston mounted to the center hub so as to be axially moveable along the center hub and rotatable relative thereto; and
   the cylindrical outer portion of the piston housing member slidably engaging the pressure portion of the lockup piston.

2. The hydrokinetic torque-coupling device as defined in claim 1, wherein a radially outer end of the clutch biasing spring is located in an annular recess in the cover shell of the casing for supporting the radially outer end of the clutch biasing spring in the axial and radial directions.

3. The hydrokinetic torque-coupling device as defined in claim 1, wherein a hydraulically sealed first hydraulic chamber is defined between the lockup piston, the piston housing member and the center hub, and wherein a second hydraulic chamber is defined between the lockup piston, the cover shell and the center hub.

4. The hydrokinetic torque-coupling device as defined in claim 3, wherein the center hub has a first hydraulic channel connected to the first hydraulic chamber so as to operate the lockup clutch, and a second hydraulic channel connected to the second hydraulic chamber.

5. The hydrokinetic torque-coupling device as defined in claim 1, further comprising an output hub operatively coupled to the turbine wheel, wherein the output hub is rotatable relative to the center hub.

6. The hydrokinetic torque-coupling device as defined in claim 1, further comprising a torsional vibration damper including an input member, a plurality of circumferentially acting torque transmitting elastic members and an output member elastically coupled to the input member through the torque transmitting elastic members.

7. The hydrokinetic torque-coupling device as defined in claim 6, wherein the second disc carrier is non-rotatably secured to the input member of the torsional vibration damper.

8. The hydrokinetic torque-coupling device as defined in claim 7, wherein the input member includes an annular first retainer plate, and an annular second retainer plate disposed axially opposite the first retainer plate and non-rotatably coupled thereto.

9. The hydrokinetic torque-coupling device as defined in claim 8, wherein the first retainer plate is non-rotatably coupled to the turbine wheel, and wherein the second retainer plate is non-rotatably coupled to the second disc carrier.

10. The hydrokinetic torque-coupling device as defined in claim 1, further comprising a piston biasing spring disposed axially between the lockup piston and the casing so as to bias the lockup piston away from the clutch pack.

11. The hydrokinetic torque-coupling device as defined in claim 10, wherein the piston biasing spring is a Belleville washer or a diaphragm spring.

12. The hydrokinetic torque-coupling device as defined in claim 10, wherein the piston biasing spring engages the lockup piston through an engagement disc supporting the piston biasing spring in the axial direction.

13. The hydrokinetic torque-coupling device as defined in claim 12, wherein the engagement disc has higher hardness than the piston biasing spring.

14. The hydrokinetic torque-coupling device as defined in claim 1, further comprising a piston biasing spring disposed axially between the lockup piston and one of the center hub and the casing so as to bias the lockup piston away from the clutch pack.

15. The hydrokinetic torque-coupling device as defined in claim 1, further comprising a piston biasing spring disposed axially between the casing and the lockup piston so as to bias the lockup piston toward the piston housing member.

16. A method for assembling a hydrokinetic torque-coupling device for coupling a driving shaft and a driven shaft together, the method comprising the steps of:
   providing a cover shell formed with an axial protrusion extending axially inwardly;

providing an impeller wheel comprising an impeller shell and impeller blades fixedly attached to the impeller shell;

providing a lock-up clutch including a first disc carrier, a second disc carrier, at least one annular drive disc, and at least one annular driven disc;

non-moveably attaching a center hub to the cover shell;

non-movably securing the first disc carrier to the cover shell;

placing a clutch biasing spring axially adjacent to the cover shell;

non-rotatably and axially movably mounting the at least one annular drive disc to the first disc carrier and placing the at least one annular driven disc adjacent to the at least one drive disc so as to define a clutch pack and to dispose the clutch biasing spring between the cover shell and the clutch pack;

axially movably mounting a lockup piston on the center hub so as to be axially moveable along the center hub and rotatable relative thereto, so that the clutch pack is disposed between the clutch biasing spring and the lockup piston, and so that a pressure portion of the lockup piston faces the axial protrusion;

providing a piston housing member having a radial plate portion and a cylindrical outer portion;

non-moveably attaching the piston housing member to the center hub so that the lockup piston is disposed between the clutch pack and the piston housing member, so that the cylindrical outer portion extends from a radially outer end of the plate portion toward the cover shell in the axial direction, so that the lockup piston is axially moveable and non-rotatable relative to the piston housing member and so that the cylindrical outer portion of the piston housing member slidably engages the pressure portion of the lockup piston; and non-rotatably and axially movably mounting the at least one annular driven disc to the second disc carrier.

17. The method for assembling the hydrokinetic torque-coupling device as defined in claim 16, further comprising the steps of placing a piston biasing spring axially between the cover shell and the lockup piston.

18. The hydrokinetic torque-coupling device as defined in claim 1, wherein the axial protrusion is disposed radially on the same radius as the pressure portion of the lockup piston.

19. The hydrokinetic torque-coupling device as defined in claim 1, wherein the axial protrusion is disposed radially between the first disc carrier and the second disc carrier.

\* \* \* \* \*